UNITED STATES PATENT OFFICE.

JAMES JOHNSON, OF PITTSBURG, PENNSYLVANIA.

PROCESS OF REDUCING ORE.

SPECIFICATION forming part of Letters Patent No. 441,166, dated November 25, 1890.

Application filed November 5, 1889. Serial No. 329,361. (No specimens.)

*To all whom it may concern:*

Be it known that I, JAMES JOHNSON, a citizen of the United States, residing at Pittsburg, in the county of Allegheny and State of Pennsylvania, have invented or discovered certain new and useful Improvements in the Process of Reducing Ore, of which improvement the following is a specification.

The invention described herein relates to certain improvements in the direct reduction of ores to metallic iron, and has for its object, in addition to the reduction of the ore, the elimination to a great extent of the sulphur and phosphorus therefrom.

It has been necessary heretofore when treating ores high in sulphur and phosphorus by the direct process to subject such ores to a preliminary roasting in order to remove the sulphur and then treat the roasted ores in the usual manner.

In the practice of my invention the ore is reduced in a crusher or other suitable apparatus to lumps of about nut size. The crushed ore is then charged directly into the hot hearth of a reverberatory or other suitable furnace preferably having a cinder bottom, and there subjected to a strong reducing-flame until the water of hydration is driven off and the ore is in condition to readily part with its oxygen and is "hungry," so to speak, for the carbon. When the ore is in this condition, from twenty to forty per cent. (20% to 40%) of finely-pulverized carbon (determined by weight of the ore)—*i. e.*, twenty to forty pounds (more or less) of carbon for every hundred pounds of ore—is shoveled loosely onto the red-hot ore. The whole mass is then well rabbled to permit of the carbon passing down through and around the lumps of ore and effect a thorough commingling of the two. The pulverized carbon is slightly dampened prior to being charged into the furnace to prevent dusting. After the ore and carbonaceous material have been thoroughly rabbled the entire charge is protected by a light covering of pulverized carbon, which is also slightly dampened. The heat is now gradually raised, its reducing characteristics being maintained until the iron becomes pasty. It is then balled in the usual manner and removed from the furnace.

While any pulverized carbonaceous material can be employed in this process, it is particularly adapted to the employment of volatile carbons—such as coke, charcoal, petroleum-coke, &c.—which cannot be advantageously employed in the old processes, where the ore and carbon are mixed and charged simultaneously into the furnace, for the reason that the carbon will volatilize before the ore can be sufficiently heated to yield up its oxygen and take up the carbon; but in my process the carbon is not brought into play until the ore is rendered quite porous by the heat to which it is subjected and the consequent driving off of the water of hydration. This calcination of the ore lessens its tendency to fuse, in which condition it is less permeable by the reducing-gas. Thus it will be seen that the steps necessary to bring the ore to a condition requisite to the successful action of the reducing agent are effected before the reducing agent is placed in the furnace, thereby avoiding any loss or deterioration of the reducing agent incident to the practice of charging the ore and reducing agent simultaneously into the furnace. This preliminary heating not only prepares the ore for the action of the reducing agent, as hereinbefore stated, but also effects an elimination of the sulphur.

As is well known, oxide of iron will effect a reduction or elimination of the silica and phosphorus of ore; but as the oxide has a greater affinity for the silica than for the phosphorus, the latter can be eliminated only when there is an excess of oxide beyond that required for the silica. An enrichment of the slag in oxide of iron can be effected in this process in several ways—*e. g.*, by increasing the heat in the preliminary operation, or by the addition of iron or steel scale to the charge, the latter being the preferable manner of obtaining an increase of oxide. While the iron or steel scale may be added to the charge at any time, it is preferred to add it immediately before charging in the carbonaceous material.

The pulverized carbonaceous material may be dampened with water or oil, or preferably with water and oil, as the latter when subjected to the heat in the furnace will form a hydrocarbon gas, which by its combustion will prevent an injurious chilling of the ore.

If high-carbon iron is desired, it is only necessary that manganese be present during the reduction. This manganese can be obtained by adding to the charge in the reverberatory furnace the slag from open-hearth furnaces, a waste product rich in lime and manganese.

The process is the same whether hematite or magnetic or separated ores are used, and the results are equally good in all cases.

No claim is made herein, broadly, to the roasting of ores for the elimination of sulphur; but such roasting has been heretofore practiced as an operation distinct from and independent of any subsequent treatment of the ores, the roasting and reducing operations being effected in different furnaces. In my process, however, the ores are roasted not only to eliminate the sulphur and drive off the water of hydration, but also to prepare them for the action of the reducing agent.

I claim herein as my invention—

1. As an improvement in the art of reducing iron direct from ore, the method herein described, which consists in charging the ore onto the hearth of a suitable furnace, subjecting it to a reducing heat for the elimination of sulphur and water of hydration, increasing the oxide of iron in the slag by the addition of any suitable material, as iron or steel scale, adding carbonaceous material to the charge and rabbling or stirring it into the ore, and then subjecting the entire charge to a reducing heat, substantially as set forth.

2. As an improvement in the art of reducing iron direct from ore, the method herein described, which consists in charging the ore onto the hearth of a suitable furnace, subjecting it to a reducing heat, adding dampened pulverized carbonaceous material to the charge and rabbling or stirring it into the hot ore, and then subjecting the entire charge to a reducing heat, substantially as set forth.

3. As an improvement in the art of reducing iron direct from ore, the method herein described, which consists in charging the ore onto the hearth of a suitable furnace, subjecting it to a reducing heat, adding pulverized carbonaceous material to the charge and rabbling it into the ore, covering the entire charge with dampened pulverized carbonaceous material and then subjecting it to an increasing reducing heat, substantially as set forth.

In witness whereof I have hereunto set my hand.

JAMES JOHNSON.

Witnesses:
DARWIN S. WOLCOTT,
W. B. CORWIN.